US009002904B1

(12) United States Patent
Meiri et al.

(10) Patent No.: US 9,002,904 B1
(45) Date of Patent: *Apr. 7, 2015

(54) HANDLING HIBERNATION OF A PROCESS ON A STORAGE DEVICE

(71) Applicant: EMC Corporation, Hopkinton, MA (US)

(72) Inventors: David Meiri, Cambridge, MA (US); Dan Arnon, Somerville, MA (US); Arieh Don, Newton, MA (US); Ian Wigmore, Westborough, MA (US); Patrick Brian Riordan, West Newton, MA (US); John T. Fitzgerald, Mansfield, MA (US); Alex Veprinsky, Brookline, MA (US); John Sopka, Groton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/901,648

(22) Filed: May 24, 2013

Related U.S. Application Data

(62) Division of application No. 12/930,251, filed on Dec. 31, 2010, now Pat. No. 8,468,180.

(51) Int. Cl.
G06F 17/30 (2006.01)
G06F 3/06 (2006.01)

(52) U.S. Cl.
CPC .................. *G06F 3/0647* (2013.01)

(58) Field of Classification Search
CPC ............ G06F 17/30079; G06F 3/0607; G06F 3/0647; G06F 3/0683
USPC .......................................... 707/809
See application file for complete search history.

(56) References Cited

U.S. PATENT DOCUMENTS

| 7,194,538 | B1 * | 3/2007 | Rabe et al. ..................... 709/224 |
| 7,203,730 | B1 * | 4/2007 | Meyer et al. ................... 709/213 |
| 7,219,189 | B1 * | 5/2007 | Ryu et al. ....................... 711/111 |
| 7,685,462 | B1 * | 3/2010 | Leong et al. .................. 714/6.12 |
| 7,809,910 | B2 * | 10/2010 | Sudhakar ...................... 711/162 |
| 7,856,022 | B1 * | 12/2010 | Wigmore .................. 370/395.71 |
| 8,028,062 | B1 * | 9/2011 | Wigmore et al. ............. 709/224 |
| 8,028,110 | B1 * | 9/2011 | Wigmore ........................ 710/74 |
| 2011/0010518 | A1 * | 1/2011 | Kavuri et al. ................. 711/165 |

* cited by examiner

*Primary Examiner* — Sheree Brown
(74) *Attorney, Agent, or Firm* — Muirhead and Saturnelli, LLC

(57) ABSTRACT

Migrating data from an old storage device to a new storage device includes creating new paths to the new storage device, freezing old paths to the old storage device, transferring metadata corresponding to the old storage device to the new storage device, where state information is transferred from the old storage device to the new storage device, and thawing the new paths. Migrating data from an old storage device to a new storage device may also include creating new volumes on the new storage device and transferring data from the old storage device to the new storage device. Migrating data from an old storage device to a new storage device may also include dismantling the old paths.

12 Claims, 8 Drawing Sheets

HANDLING HIBERNATION OF A PROCESS ON A STORAGE DEVICE

RELATED APPLICATIONS

This application is a divisional of U.S. patent application Ser. No. 12/930,251 (pending), filed on Dec. 31, 2010, which is incorporated by reference herein in its entirety.

BACKGROUND OF THE INVENTION

1. Technical Field

This application relates to the field of storage devices, and more particularly to the field of migrating data between storage devices.

2. Description of Related Art

It is desirable to be able to move user applications and data among servers and storage arrays in a non-disruptive fashion while the user is actively using the applications and/or data. Although various techniques exist to facilitate non-disruptive data migration, these techniques do not necessarily properly transfer I/O state information. However, many systems rely on metadata, such as I/O state information, for proper operation. For example, in some computer cluster configurations, each of the computers maintains its state (active or passive) and, in some cases, changes its state, based on I/O metadata. Such a system may not operate properly if data was migrated without also properly migrating the metadata.

Accordingly, it is desirable to provide a system that can migrate data as well as associated metadata, including state information, associated with the data.

SUMMARY OF THE INVENTION

According to the system described herein, migrating data from an old storage device to a new storage device includes creating new paths to the new storage device, freezing old paths to the old storage device, transferring metadata corresponding to the old storage device to the new storage device, where state information is transferred from the old storage device to the new storage device, and thawing the new paths. Migrating data from an old storage device to a new storage device may also include creating new volumes on the new storage device and transferring data from the old storage device to the new storage device. Migrating data from an old storage device to a new storage device may also include dismantling the old paths. Transferring metadata may include exporting the metadata from the old storage device to a platform-independent format and then subsequently importing the metadata to the new storage device, where a format of the metadata on the new storage device may be different from a format of the metadata on the old storage device Each of the paths may include a source port, a target port, a LUN, and a state descriptor. The paths may correspond to SCSI connections. A process manager may interact with a SCSI driver to transfer the metadata.

According further to the system described herein, computer software, provided in a non-transitory computer readable medium, migrates data from an old storage device to a new storage device. The software includes executable code that creates new paths to the new storage device, executable code that freezes old paths to the old storage device, executable code that transfers metadata corresponding to the old storage device to the new storage device, where state information is transferred from the old storage device to the new storage device, and executable code that thaws the new paths. The computer software may also include executable code that creates new volumes on the new storage device and executable code that transfers data from the old storage device to the new storage device. The computer software may also include executable code that dismantles the old paths. Executable code that transfers metadata may include executable code that exports the metadata from the old storage device to a platform-independent format and executable code that imports the metadata to the new storage device, where a format of the metadata on the new storage device may be different from a format of the metadata on the old storage device. Each of the paths may include, a source port, a target port, a LUN, and a state descriptor. The paths may correspond to SCSI connections. A process manager may interact with a SCSI driver to transfer the metadata.

According further to the system described herein, handling hibernation of a process includes freezing paths corresponding to the process, freezing the process, and obtaining a snapshot of data and metadata for the process. Handling hibernation of a process may also include, following obtaining the snapshot, thawing the paths corresponding to the process. Metadata for the process may be stored in a platform-independent format. The paths may correspond to SCSI connections. Handling hibernation of a process may also include, following obtaining the snapshot, restoring the snapshot and then resuming the process, and following resuming the process, thawing the paths. Handling hibernation of a process may also include, following thawing the paths, freezing the paths a second time, following freezing the paths a second time, restoring the snapshot and then resuming the process, and following resuming the process, thawing the paths a second time.

DETAILED DESCRIPTION OF VARIOUS EMBODIMENTS

Figure 1:
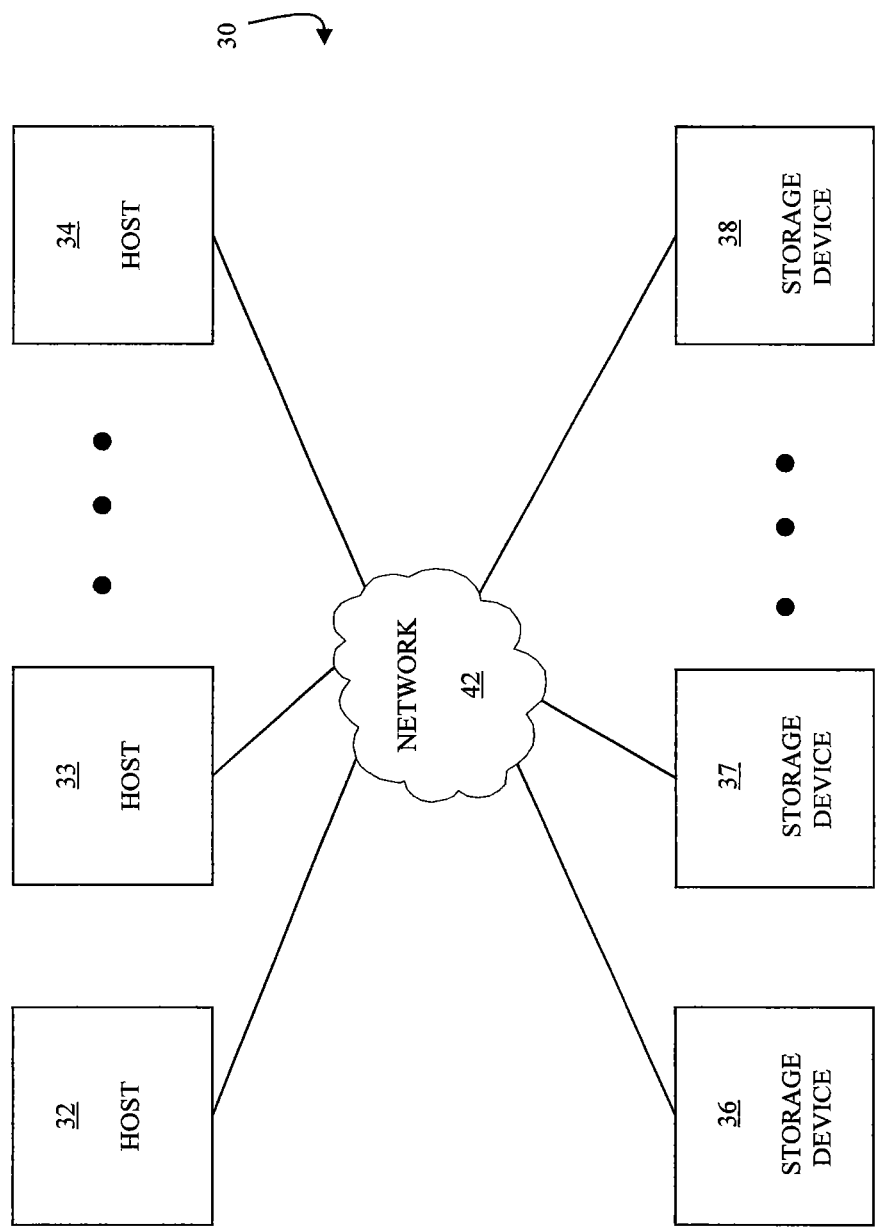
FIG. 1 is a schematic a diagram that shows a plurality, of hosts coupled to a plurality of storage devices via a network according to an embodiment of the system described herein.

Referring to FIG. 1, a diagram 30 shows a plurality of hosts 32-34 coupled to a plurality of storage devices 36-38 via a network 42. The hosts 32-34 represent any processing devices. There may be any number of hosts and the hosts 32-34 may or may not be the same (i.e., the same type of device). Similarly, the storage devices 36-38 represent any storage devices. There may be any number of storage devices and the storage devices 36-38 may or may not be the same (i.e., same type of device). Each of the hosts 32-34 may be selectively coupled to one or more of the storage devices 36-38 to access data therefrom through the network 42. Note that each of the storage devices 36-38 may be coupled to more than one of the hosts 32-34. The network may be any appropriate mechanism for providing data interconnections, including a SAN, a WAN, a LAN, the World-Wide Web, a cloud, etc. or some combination thereof.

The system described herein provides for porting executable images (e.g., programs) from one of the hosts 32-34 to another one of the hosts 32-34, porting data images (e.g., data) from one of the storage devices 36-38 to another one of the storage devices 36-38, and/or both. As discussed in detail herein, it is desirable to be able to maintain metadata (state information) in connection with porting executable images and/or data. The system described herein provides a mechanism for doing so. The hosts 32-34 are connected to the storage devices 36-38 via paths therebetween. Paths are described in more detail below.

Figure 2:
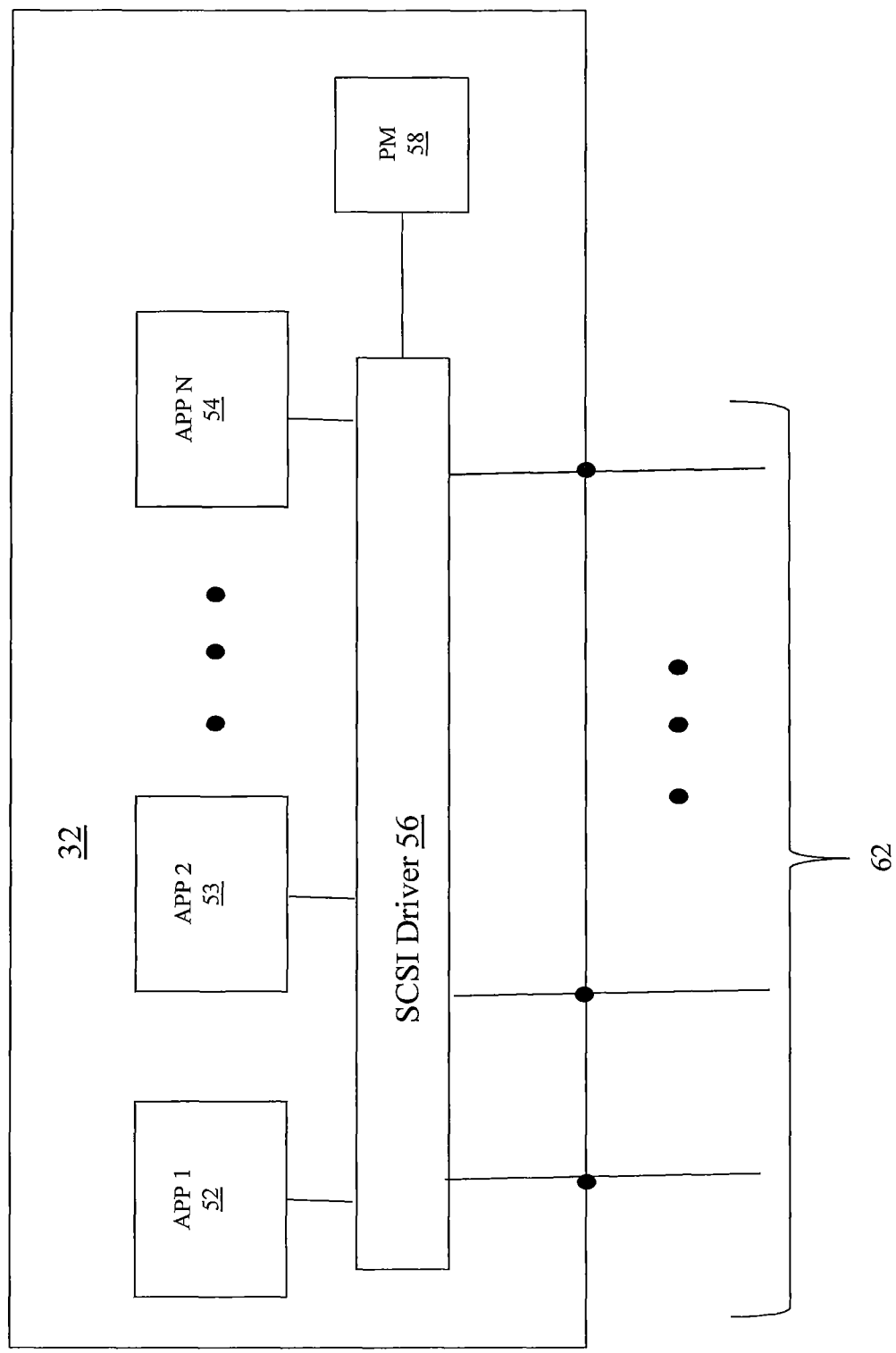
FIG. 2 is a schematic diagram illustrating in more detail, a host according to an embodiment of the system described herein.

Referring to FIG. 2, the host 32 is shown in more detail as including a plurality of applications 52-54, a SCSI driver 56, and a process manager 58. Although the specific host 32 is shown in FIG. 2, the discussion herein is meant to include any host or other processing device. The applications 52-54 represent any number of applications that may perform any appropriate type of processing. The applications 52-54 send and receive I/O through the SCSI driver 56, which provides appropriate low level driver functionality to the applications 52-54. In an embodiment herein, the SCSI driver 56 may provide conventional SCSI I/O functionality.

The host 32 also includes a plurality of ports 62 that provide logical I/O channels for the host 32. Each of the ports 62 may correspond to a separate physical connection or at least some of the ports 62 may correspond to the same physical connection. The SCSI driver 56 may maintain a connection table indicating which of the ports 62 is coupled to which of the applications 52-54 and also possibly indicating the state of each of the ports 62. Each of the applications 52-54 may also internally maintain a similar connection table. In some embodiments, it is possible for each of the applications 52-54 and/or the SCSI driver 56 to use different internal identifiers to refer to the same one of the ports 62.

The process manager 58 interacts with the SCSI driver 56 to facilitate migration of port metadata (state information) along with migration of corresponding data. The process manager 58 may also facilitate hibernation, as described in more detail elsewhere herein. That is, for example, if the host 32 initially performs I/O operations using the storage device 36, but then switches to using the storage device 37, the process manager 58 facilitates the switch by handling the appropriate transfer of the metadata corresponding to the data. Operation of the process manager 58 is described in more detail elsewhere herein.

Figure 3:
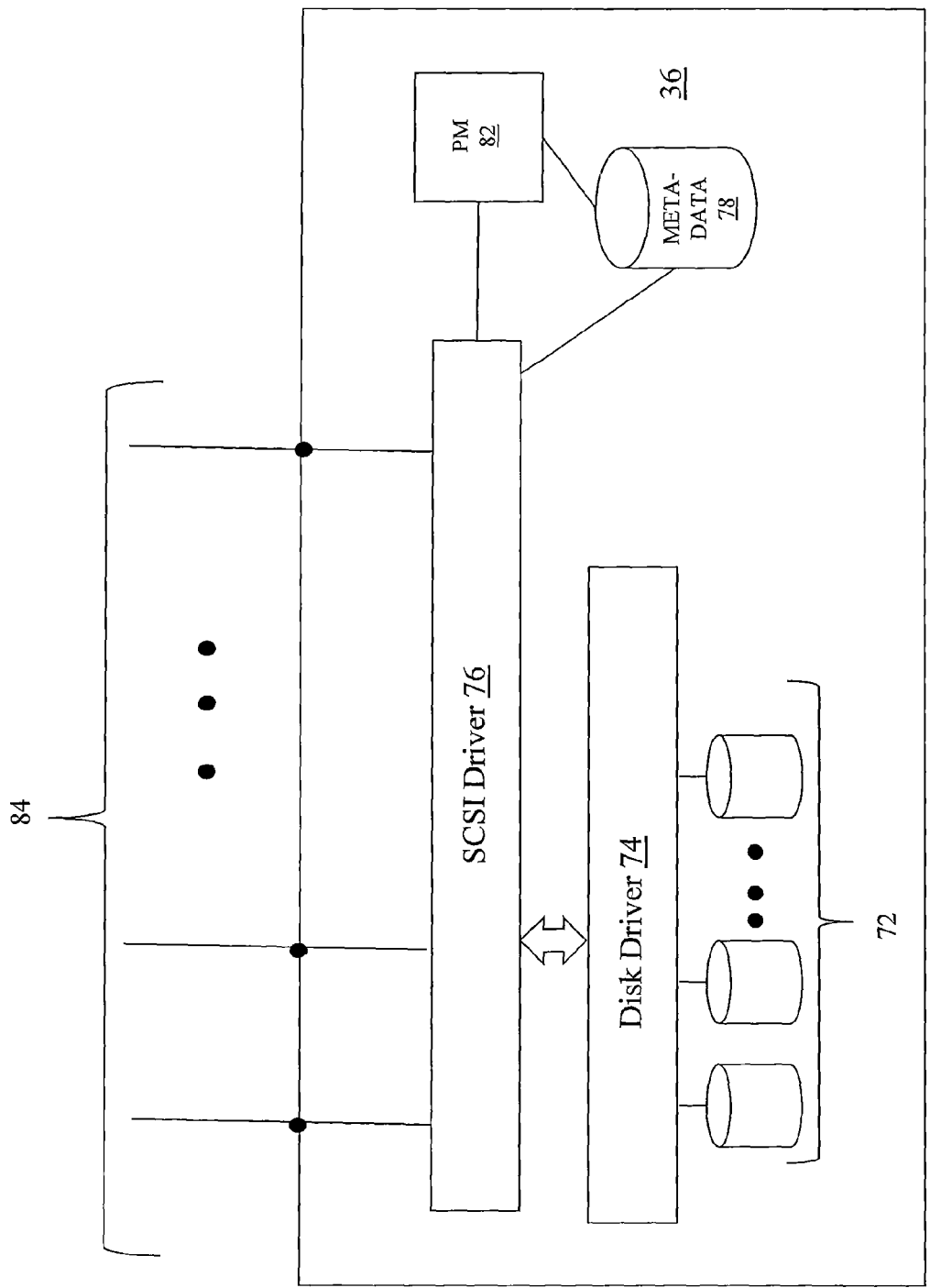
FIG. 3 is a schematic diagram illustrating in more detail a host according to an embodiment of the system described herein.

Referring to FIG. 3, the storage device 36 is shown in more detail as including one or more storage units 72, a disk driver 74 coupled to the storage units 72, and a SCSI driver 76 coupled to the disk driver 74. Although the specific storage device 36 is shown in FIG. 3, the discussion herein is meant to include any appropriate storage device. The storage device 36 may be a disk array storage device so that the storage units 72 are disk drives. Of course, the storage device 36 could be any other type of storage device. The SCSI driver 76 is like the SCSI driver 56, discussed above in connection with FIG. 2, except that the SCSI driver 76 provides I/O for the storage device 36 rather than the host 32. In an embodiment herein, the SCSI driver 76 acts as a target to receive I/Os while the SCSI driver 56 acts as an initiator to send I/Os.

The storage device 36 also includes SCSI metadata 78 (state information), coupled to the SCSI driver 76, that maintains, inter alia, the state of connections to the storage device 36. A process manager 82 is coupled to both the SCSI driver 76 and the SCSI metadata 78. The storage device 36 also includes a plurality of ports 84 that provide logical I/O channels for the storage device 36. As with the host 32, each of the ports 84 may correspond to a separate physical connection or at least some of the ports 84 may correspond to the same physical connection. The SCSI driver 76 may maintain a connection table indicating which of the ports 84 is coupled to which of the storage units 72 and also possibly indicating the state of each of the ports 84. The disk driver 74 may also internally maintain a similar connection table. In some embodiments, it is possible for the different tables to use different internal identifiers to refer to the same one of the ports 84.

The process manager 82 interacts with the SCSI driver 76 to facilitate migration of port metadata (state information) along with migration of corresponding data. The process manager 82 may also facilitate hibernation, as described in more detail elsewhere herein. That is, for example, if the host 32 initially performs I/O operations using the storage device 36, but then switches to using the storage device 37, the process manager 84 facilitates the switch by handling the appropriate transfer of metadata. Operation of the process manager 84 is described in more detail elsewhere herein.

Connections between the hosts 32-34 and the storage devices 36-38 may be provided by defining a plurality of paths therebetween through the network 42. Each of the paths may include a source port (initiator port), a destination port (target port), and a port state identifier (state descriptor). The source port may correspond to a port on one of the hosts 32-34 while the destination port may correspond to a port on one of the storage devices 36-38. The defined paths may correspond to the connection tables maintained by the hosts 32-34 and the storage devices 36-38.

In an embodiment herein, the process manager 58 of the host 32 is used to facilitate migration from one of the hosts 32-34 to another one of the hosts 32-34 while the process manager 82 of the storage device 36 is used to facilitate migration from one of the storage devices 36-38 to another one of the storage devices 36-38. Of course, it is also possible to have other arrangements so that, for example, the process manager 58 of the host 32 may be used to facilitate migration from one of the storage devices 36-38 to another one of the storage devices 36-38 and/or the process manager 82 of the storage device 36 is used to facilitate migration from one of the hosts 32-34 to another one of the hosts 32-34.

Figure 4:
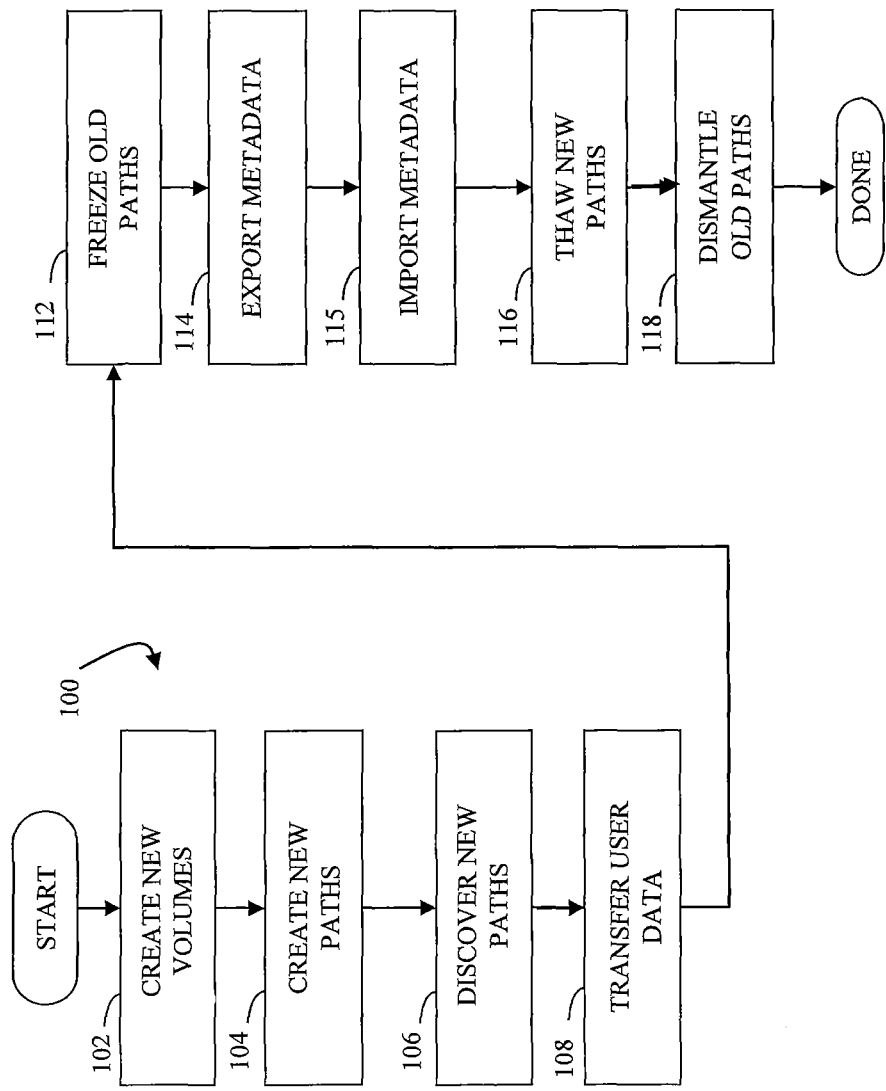
FIG. 4 is a flow chart illustrating steps performed by a process manager for migration according to an embodiment of the system described herein.

Referring to FIG. 4, a flow chart 100 illustrates steps performed in connection with migrating from using a first one of the storage devices 36-38 (old storage device) to using a second one of the storage devices 36-38 (new storage device). As used herein, "old" and "new" may be used to refer to source and target storage devices, respectively, and may not necessarily indicate a relative age of the storage devices. It is desirable to be able to provide the migration in a way that is transparent to an entity accessing the data and does not require suspension of the entities accessing the data. That is, one or more of the applications 52-54 on one or more of the hosts 32-34 operate continuously before and after migration of data from one of the storage devices 36-38 to another one of the storage devices 36-38. As described elsewhere herein, providing a seamless migration includes properly migrating metadata (state information) associated with the data so that each new path takes on state information of a corresponding old path. Note that the processing illustrated by the flow chart 100 may be performed by the process manager 82 of the storage device 36 and/or by other appropriate processes/devices, such as the process manager 58 possibly in concert with other processing devices.

Processing for the flow chart 100 begins at a step 102 where new volumes (e.g., logical volumes) are created on the new storage device. The new volumes will contain the data that is being transferred to the new storage device. Following the step 102 is a step 104 where new paths are created from the one or more of the hosts (computing devices) to the new storage device. Following the step 104 is a step 106 where the new paths are discovered (e.g., the source entities determine the target ports and characteristics of devices corresponding thereto). In an embodiment herein, the paths to the new storage device are initiated in a frozen state, which prevents any new I/O operations being performed using those paths.

Following the step 106 is a step 108 where the user data is transferred from the volumes on the old storage device to the volumes on the new storage device using any appropriate technique. Mechanisms for transferring user data are known. In some embodiments, user data migration is initiated at the step 108 and is performed asynchronously and in parallel with respect to the remaining processing performed in connection with the flow chart 100.

Following the step 108 is a step 112 where the paths from the old storage device are frozen. Making the paths frozen at the step 112 prevents any new I/O operations being performed using those paths. In some embodiments, new I/Os may be queued without being processed. Note, however, that any I/O operations initiated prior to freezing the paths are either completed or, in some embodiments, aborted. Following the step 112 is a step 114 where metadata (including state information) for the device is exported. In an embodiment herein, the metadata may be exported into a platform-independent format. In some cases, other transformations may be performed. Note that the metadata may be provided on a per volume basis.

Following the step 114 is a step 115 where the metadata is imported to the new storage device. As discussed elsewhere herein, the metadata may be exported in a platform-independent format which can be subsequently imported by (or on behalf of) a storage device. The platform-independent format may be converted to a format for a specific platform for the new storage device in connection with importing the metadata.

Following the step 115 is a step 116 where the paths to the new storage device (discussed above) are thawed to allow I/O operations therewith. Following the step 116 is a step 118 where the paths to the old storage device are dismantled. Dismantling the old paths at the step 118 is performed by an appropriate mechanism depending upon how the paths are implemented. Following the step 118, processing is complete.

Note that, in some cases, the result of freezing the old paths at the step 112 may leave unprocessed I/Os in the paths prior to dismantling the paths at the step 118. Of course, as discussed elsewhere herein, although freezing a path prohibits new I/Os from being provided, the path is still capable of processing I/Os that were already in process before the freeze operation (i.e., draining the path). However, it is possible for some I/Os not to drain prior to dismantling the path at the step 118. In some cases, a host will realize that the outstanding I/O to those paths has not completed (timed out), in which case the host will re-issues the same I/Os through another path (i.e., one of the new paths).

Figure 5:
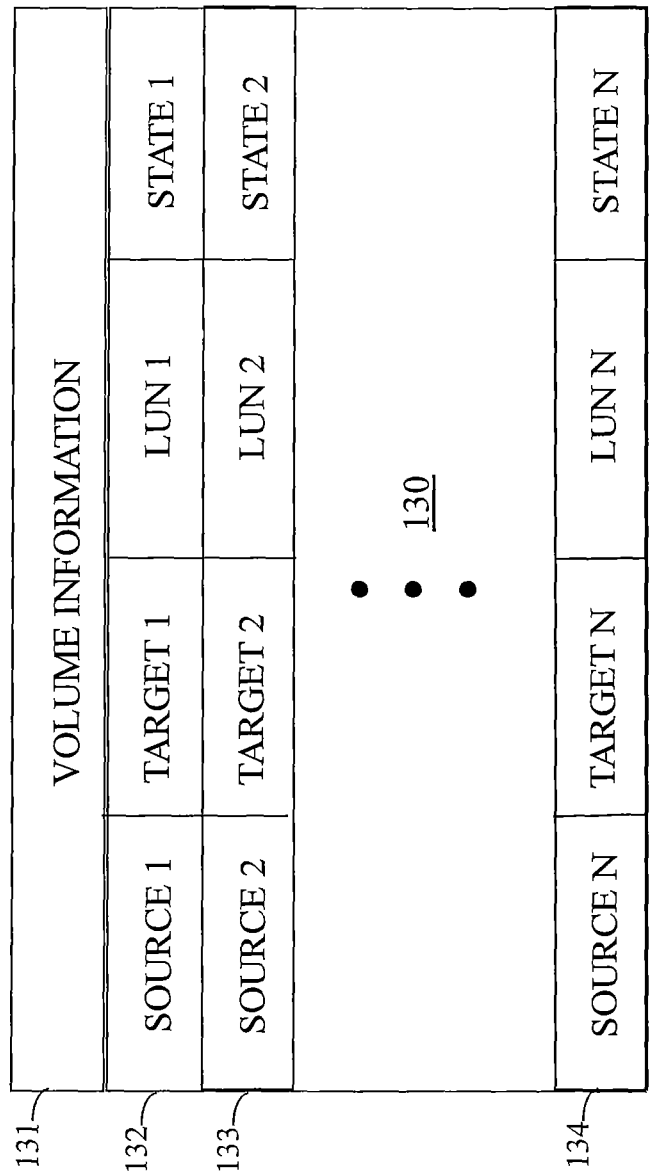
FIG. 5 is a diagram illustrating a volume entry for a metadata table according to an embodiment of the system described herein.

Referring to FIG. 5, a volume entry 130 for a metadata table includes volume information 131 and a plurality of path entries 132-134 where each describes a specific path to or from the volume. In an embodiment herein, a metadata table for an application includes an entry for each of the volumes used by the application where each of the entries is like the volume entry 130 shown in FIG. 5. The volume information 131 includes volume specific metadata, such as the volume geometry, the world-wide name of the volume, etc. Of course, the particular volume metadata used for the volume information 131 is somewhat implementation dependent.

Each of the path entries 132-134 includes, an initiator port, a target port, a logical unit number (LUN), and a state descriptor. The initiator port may be the port that sends I/Os through the path while the target port receives I/Os through the path. The port identifiers may be global identifiers that distinguish particular ports from other ports. The LUNs, on the other hand, may be local to whatever entity is maintaining a copy of the table 130. The state descriptor may indicate information about the path in the context of the volume metadata. In an embodiment herein, the path state information may include reservation information, for example corresponding to SCSI-2 or SCSI-3 reservations. In addition, the path state information may include key registrations and other information created by a host. In some cases, the path state information may indicate whether a path is blocked, frozen or unfrozen.

In an embodiment herein, the metadata table 130 may be transferred by first creating a data structure to contain the information in the table 130, populating the structure with data from the table 130, and then using the structure to create a new version of the table 130 at the new storage device. Note that the system described herein may be used in instances where data is being migrated to dissimilar types of storage devices, and the metadata table 130 may have a different structure at the new storage device than at the old storage device. The data structure used to store the metadata table may be platform independent. In some embodiments, other types of transformations may be provided. For example, the transformation may include adding a Unit Attention message to all the new paths, to notify the host that all the IOs that were queued in the old paths are lost and have to be retried.

Figure 6:
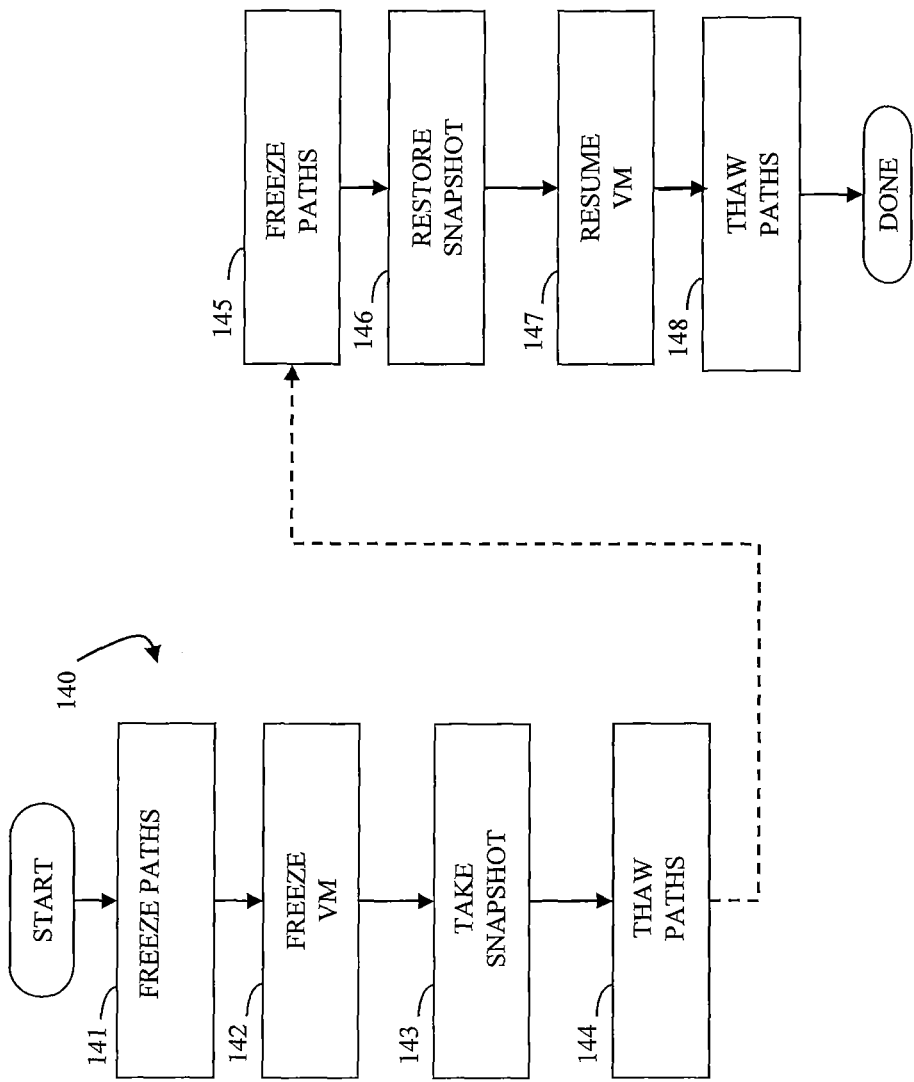
FIG. 6 is a flow chart illustrating steps performed by a process manager for hibernation according to an embodiment of the system described herein

Referring to FIG. 6, a flow chart 140 illustrates steps performed in connection with hibernating and then subsequently thawing a process using the system described herein. As with migration, it is desirable to be able to provide hibernation in a way that is transparent to an entity accessing the data and does not require suspension of the entities accessing the data. That is, one or more of the applications 52-54 on one or more of the hosts 32-34 operate continuously before and after hibernation. Note that the processing illustrated by the flow chart 140 may be performed by the process manager 82 of the storage device 36 and/or by other appropriate processes/devices, such as the process manager 58 possibly in concert with other processing devices.

Processing for the flow chart 140 begins at a step 141 where the paths to the storage device of the process are frozen. Making the paths frozen at the step 141 prevents any new I/O operations being performed using those paths. Note, however, that any I/O operations initiated prior to freezing the paths are completed. Following the step 141 is a step 142 where the VM corresponding to the process being hibernated is frozen (suspended). Following the step 142 is a step 143 where a snapshot is obtained of the current data, including the state of the data and any metadata corresponding to data volumes used by the virtual machine. In some embodiments, the metadata may be stored in a platform-independent format. Following the step 143 is a step 144 where the paths are thawed to allow I/O operations therewith.

After some time, it may be desirable to wake up from hibernation. Accordingly, following the step 144 is a step 145 where the paths for the VM are frozen. Note that, in some embodiments, the steps 144, 145 may be optional. For example, if no other processes are using the data, then the step 144, 145 may be omitted so that the paths remain frozen until the process is revived from hibernation. Following the step 145 is a step 146 where the snapshot (obtained at the step 143) is restored, including any metadata corresponding to the snapshot. Following the step 146 is a step 147 where the VM is resumed. Following the step 147 is a step 148 where the paths are thawed. Following the step 148, processing is complete.

Figure 7:
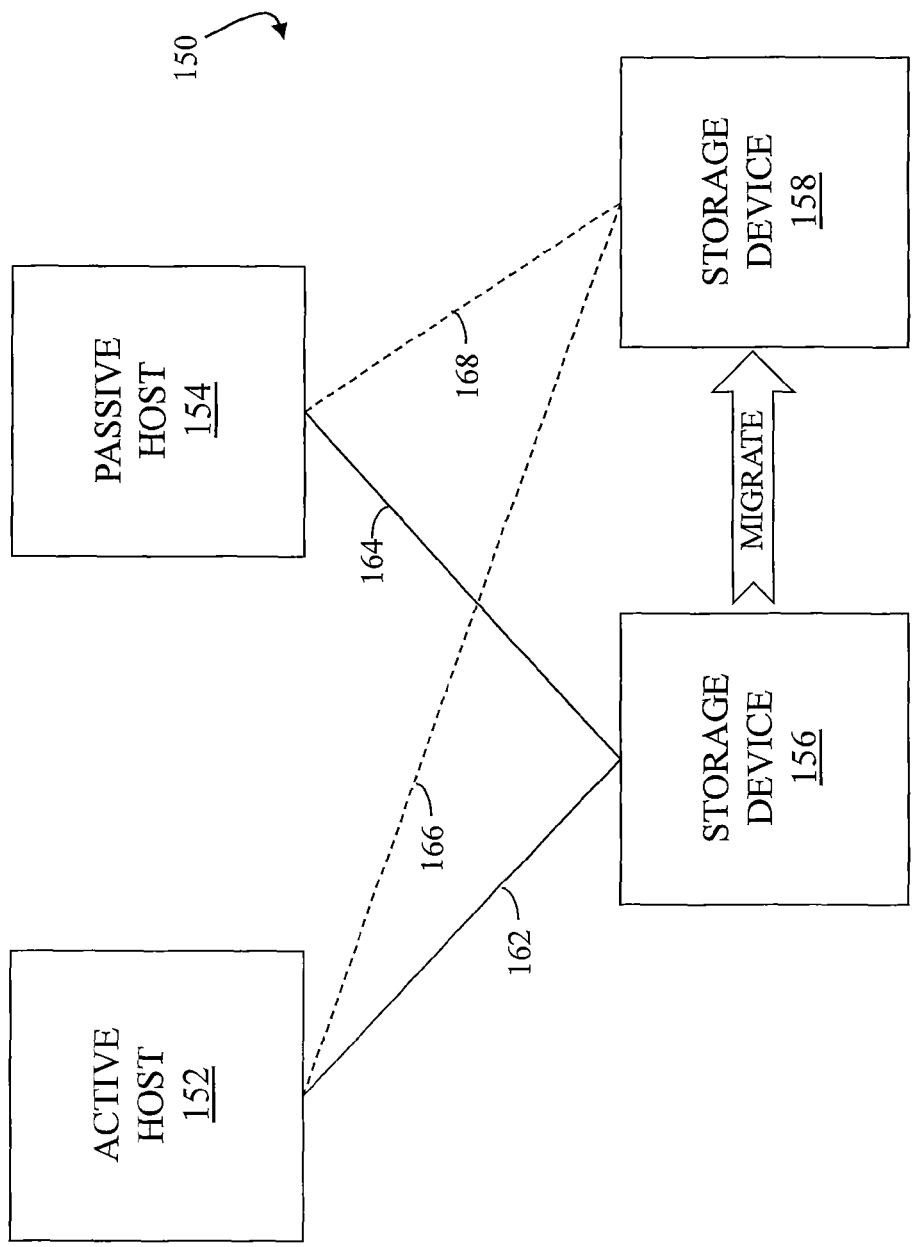
FIG. 7 is a schematic a diagram that shows an active host and a passive host coupled to an old storage device and a new storage device according to an embodiment of the system described herein.

Referring to FIG. 7, a diagram 150 illustrates an active host 152 and a passive host 154 accessing a storage device 156. In the example of FIG. 7, the active host 152 and the passive host 154 access the same data on the storage device 156. The active host 152 performs work in the form of one or more applications that read and write data to the storage device 156. The passive host 154 is maintained as a fallback in case the active host 152 fails. As described in more detail elsewhere herein, the system uses storage state information to determine when to make the passive host 154 active.

The diagram 150 also illustrates migrating data from the storage device 156 to another storage device 158. Migrating the data includes migrating corresponding state information so that, after the migration, the active host 152 and the passive host 154 preserve the relationship that existed prior to the migration. A first path 162 is provided from the active host 152 to the storage device 156 while a second path 164 is provided from the passive host 154 to the storage device 156. As a result of the migration, the path 162 is replaced by a new path 166 from the active host 152 to the new storage device 158 while the path 164 is replaced by a new path 168 from the passive host 154 to the new storage device 158. As discussed elsewhere herein, it is important that the state of the paths be preserved.

Figures 8, 9:
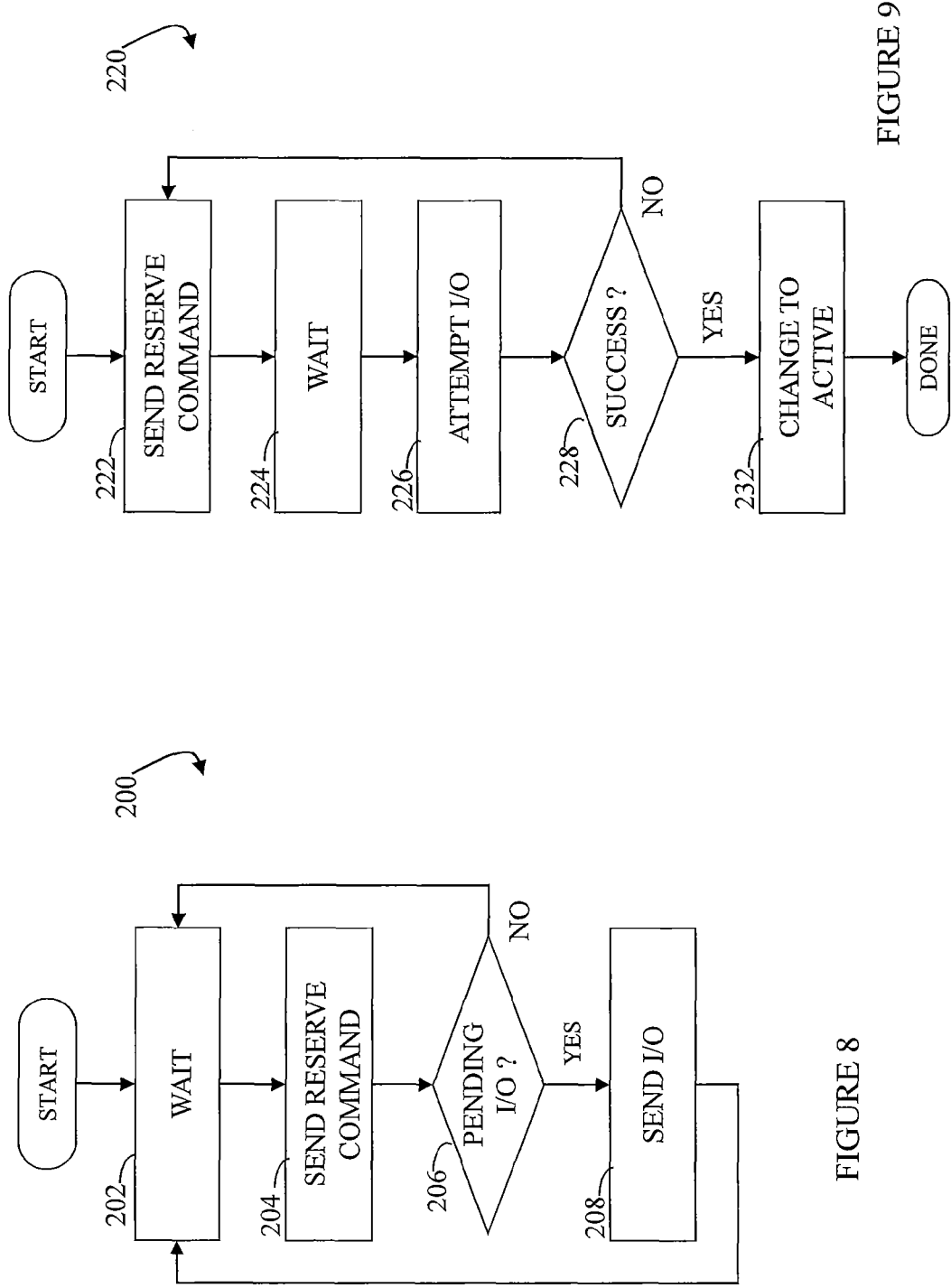
FIG. 8 is a flow chart illustrating steps performed by an active host to maintain its status in connection with the system described herein.
FIG. 9 is a flow chart illustrating steps performed by a passive host to maintain its status and possibly become an active host in connection with the system described herein.

Referring to FIG. 8, a flow chart 200 illustrates steps performed by the active host 152 in connection with maintaining its status. In an embodiment herein, the storage devices 156, 158 maintain a table like that shown in FIG. 5 and discussed above. The paths for the active host 152 are in a reserved state (allowing I/O operations between the active host 152 and the storage device 156) while the paths for the passive host 154 are in a blocked state. In an example illustrated herein, a host can request that a reservation between the storage device and another host be broken. If the other host does not re-reserve the path, the host that breaks the reservation becomes the active host. This is illustrated in more detail below.

Processing for the flow chart 200 begins at a first step 202 where the active host waits for a predetermined amount of time. The amount can be any amount, such as three seconds. Following the step 202 is a step 204 where the active host 152 sends a reservation command to the storage device. Following the step 204 is a test step 206 where it is determined if the active host 152 has any pending I/O operations. If not, then control transfers back to the step 202 for another iteration. Otherwise, control transfers from the step 206 to a step 208 where the active host 152 sends the I/O to the storage device. Following the step 208, control transfers back to the step 202 for another iteration.

Referring to FIG. 9, a flow chart 220 illustrates steps performed by the passive host 154 in connection with maintaining its status and possibly becoming active if conditions warrant. Processing begins at a first step 222 where the passive host 154 sends a reservation command to the storage device. Following the step 222 is a step 224 where the passive host 154 waits a predetermined amount of time. The amount of time may be any amount that is longer than the amount of time the active host 152 waits at the step 202, discussed above. In an embodiment herein, the amount is ten seconds.

Following the step 224 is a step 226 where the passive host 154 attempts an I/O operation. Note that if the active host 152 is operational, then the active host 152 would have sent a reservation command while the passive host was waiting at the step 224. On the other hand, if the active host 152 is not operational, then the reservation provided by the passive host at the step 222 would have been the most recent reservation command received by the storage device. Following the step 226 is a test step 228 where it is determined if the I/O attempted at the step 226 is successful. If not (the active host 152 is operational), then control transfers back to the step 222 for another iteration. Otherwise, control transfers from the step 228 to a step 232 where the passive host 154 changes its status to active. Following the step 232, processing is complete.

As can be seen from the example of FIGS. 7-9, discussed above, it is important to maintain state information when migrating data from one storage device to another. Otherwise, if state information is not maintained, then the passive host 154 may incorrectly change its status to active or may incorrectly maintain its status as passive when it should be active. The state of the new path to the new storage device should be the same as the state of the old path when the migration occurred.

The system described herein may be used for migrating executable images between hosts as well as migrating data on storage devices. The system may also be used to hibernate and then reactivate processes/applications on hosts. A process such as a virtual machine, an application or an entire physical server, may wish to stop execution and resume it later from the exact same point, without the need for a restart (reboot). The server can freeze its resources (such as memory, registers, application state, swap files, etc.) and can freeze the SCSI state of the data. Later, the process manager can instruct the server (or a different server) to import the state and restart the data devices from exactly the same point as when hibernation was initiated. This enables the process to resume from hibernation with the same state in the server (memory, registers, etc.), the application (swap files, etc.) and storage (data, SCSI state). In turn, this means that the process can resume and start running immediately, without the need to wait for a restart.

The system may also be used to facilitate remote access. In this case, a storage array may import the SCSI state of a logical unit in order to present a cloned path to a host. This path may have all the attributes and state of the source path. The storage array presenting the new path does not have to have storage for the logical unit. Instead, the logical unit can forward any 10 requests to a path that is connected to the storage.

Note that, in some instances, the order of steps in the flowcharts may be modified, where appropriate. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. The system described herein includes computer software, in a non-transitory computer readable medium, that executes any of the steps described herein.

While the invention has been disclosed in connection with various embodiments, modifications thereon will be readily apparent to those skilled in the art. Accordingly, the spirit and scope of the invention is set forth in the following claims.

What is claimed is:

1. A computer-implemented method of handling hibernation of a process using a process manager of a storage device corresponding to the process, comprising:
   freezing paths to the storage device corresponding to the process, wherein freezing the paths prevents performing new input/output (I/O) operations using the paths while allowing performance of prior I/O operations using the paths, the prior I/O operations being initiated prior to the freezing of the paths;
   after performing the prior I/O operations using the paths, suspending the process; and
   after suspending the process, obtaining a snapshot, the snapshot including at least metadata for the process;
   after obtaining the snapshot, restoring the snapshot and then resuming the process;
   determining from among the paths a first path to the storage device from an active host and a second path to the storage device from a passive host; and
   thawing the first path and maintaining the second path for at least some time as a frozen path, wherein, after thawing the first path, the first path is provided in a reserved state allowing I/O operations between the active host and the storage device, and wherein the second path, being still frozen, is provided in a blocked state preventing I/O operations between the passive host and the storage device, wherein thawing the first path occurs according to at least one of:
   (i) prior to resuming the process; or
   (ii) after resuming the process.

2. The computer-implemented method according to claim 1, wherein the first path is thawed prior to resuming the process.

3. The computer-implemented method, according to claim 1, wherein the metadata for the process is stored in a platform-independent format.

4. The computer-implemented method according to claim 1, wherein the paths correspond to small computer system interface (SCSI) connections.

5. The computer-implemented method according to claim 1, wherein the first path is thawed after resuming the process.

6. The computer-implemented method according to claim 2, further comprising:
   after thawing at least one of the paths, and prior to resuming the process, freezing the paths a second time;
   after freezing the paths the second time, restoring the snapshot and then resuming the process; and
   after resuming the process, thawing at least one of the paths a second time.

7. A non-transitory computer-readable medium storing software that, when executed by at least one processor, handles hibernation of a process, the software comprising:
   executable code that freezes paths to a storage device corresponding to the process, wherein freezing the paths prevents performing new input/output (I/O) operations using the paths while allowing performance of prior I/O operations using the paths, the prior I/O operations being initiated prior to the freezing of the paths;
   executable code that, after performing the prior I/O operations using the paths, suspends the process; and
   executable code that, after suspending the process, obtains a snapshot, the snapshot including at least metadata for the process;
   executable code that, after obtaining the snapshot, restores the snapshot and then resumes the process;
   executable code that determines from among the paths a first path to the storage device from an active host and a second path to the storage device from a passive host; and
   executable code that thaws the first path and maintains the second path for at least some time as a frozen path, wherein, after thawing the first path, the first path is provided in a reserved state allowing I/O operations between the active host and the storage device, and wherein the second path, being still frozen, is provided in a blocked state preventing I/O operations between the passive host and the storage device, wherein the first path is thawed according to at least one of:
   (i) prior to resuming the process; or
   (ii) after resuming the process.

8. The non-transitory computer-readable medium according to claim 7, wherein the metadata for the process is stored in a platform-independent format.

9. The non-transitory computer-readable medium according to claim 7, wherein the paths correspond to small computer system interface (SCSI) connections.

10. The non-transitory computer-readable medium according to claim 7, wherein the first path is thawed after resuming the process.

11. The non-transitory computer-readable method according to claim 7, wherein the first path is thawed prior to resuming the process.

12. The non-transitory computer-readable method according to claim 11, further comprising:
   executable code that, after at least one of the paths is thawed, and prior to the process being resumed, freezes the paths at least a second time;
   executable code that, after the paths are frozen at least the second time, restores the snapshot and then resumes the process; and
   executable code that, after the process is resumed, thaws at least one of the paths at least a second time.

* * * * *